United States Patent [19]

Neal

[11] 4,075,920
[45] Feb. 28, 1978

[54] POWER SAW CUTTING GUIDE

[76] Inventor: Edwin S. Neal, 101 E. Boulevard, Charlotte, N.C. 28203

[21] Appl. No.: 714,897

[22] Filed: Aug. 16, 1976

Related U.S. Application Data

[63] Continuation-in-part of Ser. No. 435,527, Feb. 8, 1974, Pat. No. 4,014,236.

[51] Int. Cl.² .................... B27B 9/04; B27B 27/06
[52] U.S. Cl. .................................... 83/745; 83/455; 83/456; 83/486
[58] Field of Search ............... 83/745, 743, 761, 455, 83/456, 486

[56] References Cited
U.S. PATENT DOCUMENTS

| 697,902 | 4/1902 | Tripp | 83/455 |
|---|---|---|---|
| 2,708,465 | 5/1955 | Huebner et al. | 83/745 |
| 3,830,130 | 8/1974 | Moore | 83/745 |

*Primary Examiner*—Willie G. Abercrombie
*Attorney, Agent, or Firm*—Sixbey, Bradford & Leedom

[57] ABSTRACT

The power saw cutting guide consists of a guide plate and preferably means to secure the guide plate against a workpiece to be cut. This securing means may include a press plate which may be bolted together with the guide against a workpiece. The guide plate is adapted to be cut to size by the first cut of a power saw guided thereby and will thus be peculiarly adapted to that particlar power saw. To facilitate this function, at least the outer extremities of the guide plate spaced from a saw guiding shoulder are formed of a material which may be easily cut by a power saw guided thereby.

10 Claims, 3 Drawing Figures

POWER SAW CUTTING GUIDE

SUMMARY OF THE INVENTION

This application is a continuation-in-part application of Ser. No. 435,527 to this inventor filed Feb. 8, 1974, and entitled Portable Straight and Square Variable Angle or Multi-Angle Sawing Guide, now U.S. Pat. No. 4,014,236.

Traditionally, in the woodworking field there have been developed a number of miter box structures and similar saw guiding structures which are adapted to guide hand saws. However, with the development of electrically powered hand held circular saws and the increasing popularity of home repair and woodworking projects, a need has arisen for a simple, universal saw guide for use with circular power saws. Such a saw guide is particularly useful in instances where an unskilled craftsman wishes to employ a circular power saw to accurately cut a door or similar large piece along a straight line which extends for a considerable distance. Such a cut becomes even more difficult when it is desired to angle the cut while proceeding along a straight line or to cut only partially through the piece.

A prime deterrent to the provision of an effective saw guide for circular saws is the requirement that the base plate for the power saw be the element engaged and guided by the saw guide. Base plates for circular power saws vary radically in size, and consequently it has been heretofore impossible to provide a universal saw guide adapted for use with any circular power saw or other power saws having base plates.

It is a primary object of the present invention to provide a novel and improved saw guide for power saws which is adapted for use with power saws having base plates of various sizes.

Another object of the present invention is to provide a novel and improves saw guide for use with power saws which is formed to a size sufficient to permit the saw guide to operate with a power saw having an extremely large base plate, but which includes material which is severable by a power saw to adapt a saw guide for universal use with power saw base plates of various sizes.

A further object of the present invention is to provide a novel and improved saw guide for circular power saws having a guide plate which is adapted to be severed by the power saw on the first cut thereof to custom fit the saw guide to that particular power saw.

A still further object of the present invention is to provide a novel and improved saw guide for circular power saws of simple, economic construction which may be effectively employed by unskilled craftsman.

These and other objects of the present invention will become readily apparent from a consideration of the following specification and accompanying claims taken in conjunction with the drawings in which:

Figure 1:
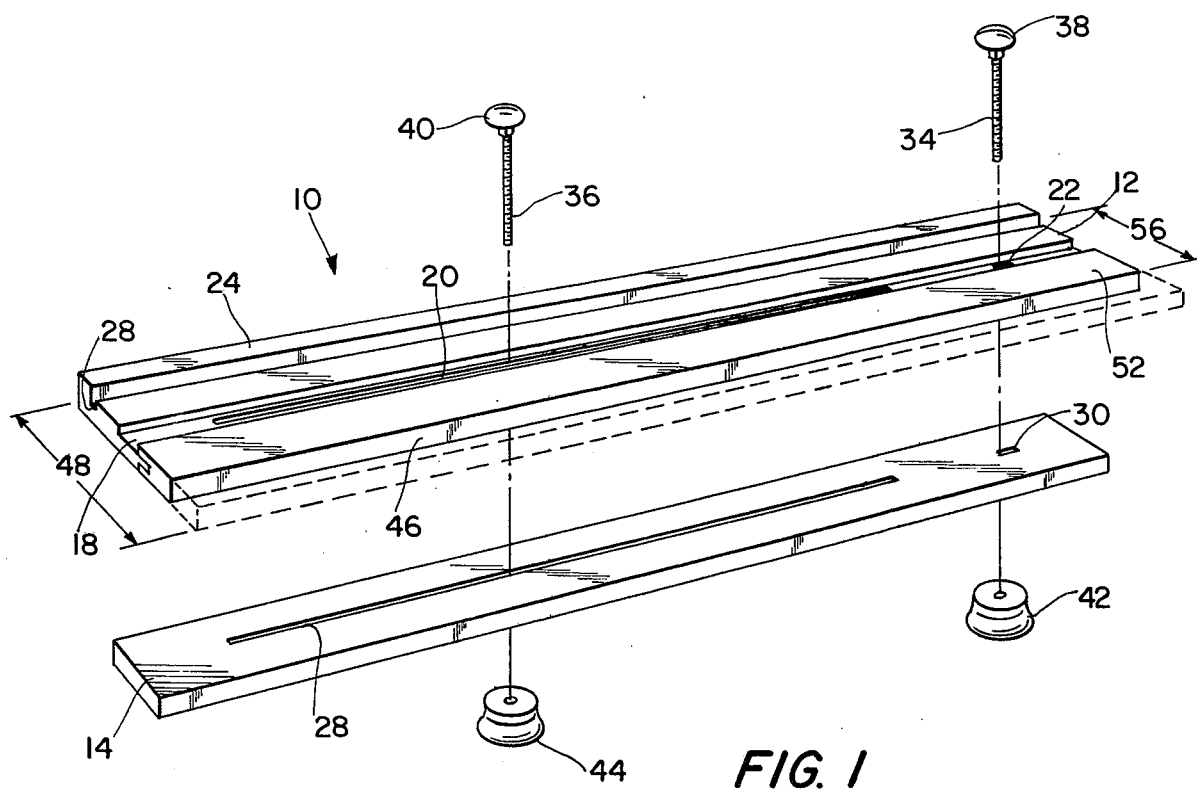
FIG. 1 is an exploded, perspective view of the saw guide of the present invention.

Referring now to the drawings, the saw guide of the present invention indicated generally at 10 includes an elongated guide plate 12 and a press plate or clamp 14. It will be noted that the guide plate and press plate are substantially of equal length, although the width of the press plate is less than that of the guide plate.

The upper surface of the guide plate 12 indicated at 16 is divided by a groove 18 which extends for an appreciable distance along the length of the guide plate. Positioned within this groove 18 is an elongated slot 20 which extends completely through the guide plate and a second shorter slot 22 which also extends completely through the guide plate. Running substantially parallel to the recess 18 and slot 20 is a shoulder 24 which projects upwardly above the surface 16 of the guide plate 12. This shoulder is provided with an inner face 26 which extends substantially perpendicular to the upper surface 16 of the guide plate and which also runs in a straight line longitudinally along the length of the guide plate to form a straight line guiding surface. A recess 28 is formed in the upper surface 16 of the guide plate at the point where the upper surface meets the inner face 26, and this recess extends along the length of the inner face 26 at the base thereof.

Figure 2:
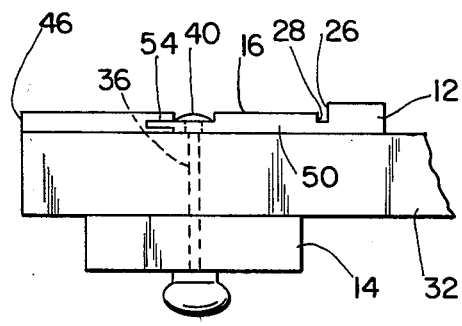
FIG. 2 is a side view of the saw guide of FIG. 1 assembled against an object to be cut.

The press plate 14 is provided with an elongated slot 28 which extends therethrough and corresponds in length to the slot 20 in the guide plate 12, and also includes a second slot 30 which extends therethrough and corresponds in position to the slot 22 in the guide plate 12. Thus, as illustrated by FIGS. 1 and 2, to assemble the saw guide 10 upon a piece 32 to be cut, the bottom surface or surface of the saw guide opposite to the top surface 16 is placed against one surface of the piece 32 while the press plate 14 is positioned against an opposite surface of the piece 32. The length of the guide plate 12 and press plate 14 is such that a threaded bolt 34 extending through the slot 22 and the slot 30 will pass outwardly of one peripheral edge of the piece 32 while a second threaded bolt 36 passing through the slot 20 and the slot 28 will extend outwardly of the opposite peripheral edge of the piece 32. Due to the elongation of the slots 20 and 28, the bolt 36 may be moved along the slots to a point which will bring both of the bolts 34 and 36 closely adjacent to the outer peripheral surfaces of the piece 32, and thus assure that the guide plate 12 will be tightly clamped thereto. The bolts 34 and 36 are provided with heads 38 and 40 which fit into the recess 18 and are consequently below the surface 16 of the guide plate. Thus these heads will not interfere with the movement of the base plate of a power saw along the surface 16.

To secure the guide plate 12 tightly against the piece 32, the ends of the bolts 34 and 36 are engaged with threaded apertures provided in knobs 42 and 44. These knobs are screwed onto the ends of the bolts 34 and 36 until the knobs engage the undersurface of the press plate 14 and draw the press plate and guide plate tightly against the opposite surfaces of the piece 32. With the guide plate thus in place, the base plate of a circular power saw is placed against the upper surface 16 of the guide plate with the flat outer edge of the base plate tightly engaged against the inner face 26 of the shoulder 24. Generally it will be the motor-side edge of the saw base plate which will engage the inner face. This should bring the side surface of the circular saw which faces the shoulder 24 closely adjacent to an edge 46 of the guide plate. As the saw base plate is moved along the inner edge 26 of the shoulder 24, the saw will provide a straight line cut of the piece 32 along a line defined by the edge 46. Any sawdust or cuttings produced by the saw which might be on the surface 16 of the guide plate will be received by either the recess 18 or the recess 28, so that the edge of the base plate of the saw may always be tightly engaged with both the surfaces 16 and 26.

It will be obvious from a consideration of the drawings, that the saw guide 10 may be fixed to an object to be cut at any cross angle in less time than would be required to mark such object for a free hand cut with a power saw. The saw guide allows actual cutting to be done just as fast as the saw blade for the power saw is capable of cutting the piece 32. It is important to note that the saw guide will permit cuts from or to zero, or cuts less than the bite of the blade to be made as precisely and quickly as full cuts. When a power saw is free hand guided, it is nearly impossible to cleanly cut a piece from or to zero, or for a depth which is less than the bite of the blade. Generally such cuts require planing or sanding to obtain a properly finished cut, but through the use of the saw guide, smooth cuts may be directly obtained.

Since the saw guide 10 eliminates contact of the saw foot or base plate with the object to be cut, damage to prefinished surfaces is eliminated. Additionally, the guide plate 12, when properly secured to the piece or object 32, reduces or eliminates the probability of splintering at the surface of such object adjacent a cut.

Of primary importance is the fact that the saw guide 10 is adapted for use with power saw base plates of various sizes, and consequently constitutes an universal saw guide. This is accomplished by making the width of the press plate 14 less than the width of the guide plate 12, so that when the bolts 34 and 36 are in place, the press plate will always be spaced inboard of the saw blade of a power saw guided by the guide plate. Additionally, the width of the guide plate indicated by the dimension 48 is made substantially greater than the distance in conventional power saws between the saw blade and the edge of the saw base plate which will engage the face 26. Also, at least a portion of the guide plate 12 spaced from the shoulder 24 is formed of wood, plastic, formica, or other material which is easily severable by the blade of a power saw to be employed with the saw guide. Obviously, the complete guide plate 12 may be made of wood or similar material which can be cut by the power saw blade, but in some instances, it is more desirable to form the guiding section of the saw guide from metal or similar hard material which may not easily be cut by a power saw. As an example in FIGS. 1 and 2, the guiding section of the guide plate indicated at 50 containing the shoulder 24, the slot 28, and the recess 18 might be formed of metal, while an outer section 52 beyond the recess 18 may be formed of wood, plastic, or other materials easily severable by a power saw. The two sections may be joined by any conventional manner, such as by providing a tongue 54 in the metal section which extends into and is joined in a known manner to a corresponding groove formed in the severable section 52. It is even possible to join the two sections by bolts so that the section 52 may be replaced if damaged. If bolts or similar fasteners are used, they must be recessed below the top surface 16 of the guide plate.

Although the severable section 52 of the guide plate 12 may begin at a point adjacent the recess 18, it is imperative that this section be severed at some point outboard of the edge of the press plate 14 which is fartherest removed from the surface 26. Thus, the severable section 52 of the guide plate must be provided at some point between the outermost edge of the guide plate remote from the inner face 26 and must extend inwardly therefrom to some point. The length of this section 52 should be such that it substantially equals the length of the guiding shoulder 24.

With the guide plate 12 constructed in the manner described, the initial dimensions of the guide plate will be those shown in dotted lines and indicated at 48 in FIG. 1. The first time that the saw guide 10 is employed to cut a piece 32, the saw blade will cut the guide plate 12 in the severable section 52 thereof to form the edge 46 which extends parallel to the inner face 26. This edge now becomes the cut indicating edge of the guide plate 12, and extends across the piece to be cut to show, without marking, the path which the guided saw blade will take.

Once the cut indicating edge 46 is formed, the dimension of the guide plate between the inner face 26 and the edge 46, as indicated at 56, will now equal the distance between the saw blade and the guided edge of the base plate for the saw, and the dotted line section of the guide plate in FIG. 1 will now have been removed. This feature universally adapts the guide plate 12 to the base plate of any power saw. Obviously, if later the guide plate were to be used with a power saw requiring a smaller dimension 56, more of the guide plate in the section 52 could be severed. Conversely, if a larger power saw is to be employed, a new wider section 52 will have to be added to the metal section 50 and then a new cut made to form a new edge 46.

Figure 3:
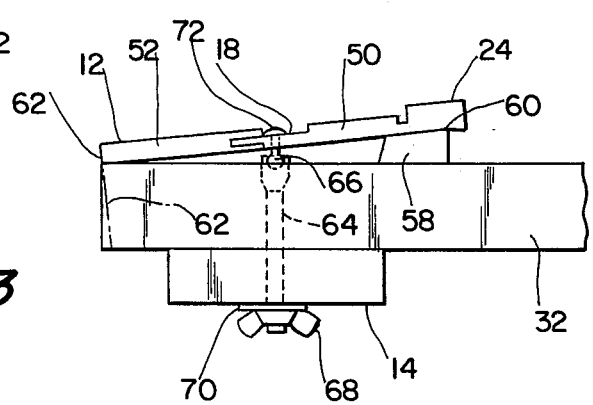
FIG. 3 is a side view of an embodiment of the saw guide of the present invention assembled against an object to be cut.

FIG. 3 illustrates the guide plate 12 with the nonservable section 50 and the severable section 52 employed in conjunction with a pitch block 58. In this embodiment, an angled notch or recess 60 is provided at one end of the guide plate beneath the shoulder 24 to receive the pitch block 58. The pitch block is intended to extend between the piece 32 to be cut and the bottom surface of the guide plate 12 so that the guide plate will cause cuts of different angles to occur at the edge of the piece 32 as indicated at 62. Obviously, the pitch blocks may be made to different sizes and angles to alter the angle of cut made at 62. To facilitate the use of the pitch block 58, the bolts 34 and 36 are replaced by swivel bolts of the type indicated at 64 having a swivel joint 66 to permit pivoting of the guide plate. A swivel bolt 64 will extend through the slot 28 while another swivel bolt will extend through the slot 30 in the press plate 14, and the swivel bolts will be tightened by means of a wing nut 68 pressing against a washer 70. At the uppermost end, the swivel bolt is connected to a head 72 which is received within the recess 18 and which has a portion extending through both the recess 20 and the recess 22 for connection at the swivel joint 66.

Although the press plate 14 is deemed to be the most efficient way of connecting the guide plate 12 to the piece 32, it is conceivable that other clamping means might be employed or that the guide plate might be utilized without being positively connected to the piece to be cut. The saw guide 10 is primarily intended for use with circular power saws, but operates effectively with any power saw having a flat base plate.

I claim:

1. A sawing guide for guiding a power saw having a flat base plate during the sawing of an object comprising a guide plate assembly including an elongated guide plate for engaging the saw base plate to control the line of cut, the guide plate including a flat surface for engaging the flat base plate for said saw, an upstanding shoulder extending above said flat surface including an inner face for engaging an edge of said flat base plate to define the line of cut, said upstanding shoulder extending substantially across the major dimension of said elongated guide plate, and a cut indicating edge extending across the major dimension of said guide plate in spaced, parallel relation to the inner face of said upstanding shoulder, the guide plate at least in the area bounded by and adjacent to said cut indicating edge being formed of a non-metallic material of a type to be cut by said power saw, angle controlling means adapted to engage said object and to extend between said object and said guide plate, and mounting means to secure said guide plate to said object and to maintain said guide plate in contact with said object, said mounting means being adapted to allow pivotal movement of said guide plate relative to said object to maintain a first portion of said guide plate in contact with said object while permitting said angle controlling means to vary the distance between a second portion of said guide plate and said object.

2. The sawing guide of claim 1 wherein at least one elongated groove is formed in the flat surface of said guide plate to receive sawdust.

3. The sawing guide of claim 1 wherein the distance between said indicating edge of the guide plate and the inner face of said upstanding shoulder is substantially equal to the distance between the edge of the power saw base plate to engage said inner face and the saw blade for said power saw.

4. The sawing guide of claim 1 wherein said guide plate is formed of two materials, a first section of said guide plate including the area adjacent said indicating edge being formed of non-metallic material of a type to be cut by said power saw and a second section of said guide plate including said upstanding shoulder and a portion including some of said flat surface adjacent said inner face being formed of metal.

5. The sawing guide of claim 1 wherein said mounting means includes an elongated press plate for contacting the object on a surface thereof opposite to that contacted by said guide plate, and bolt means extending between said guide plate and said press plate, said bolt means operating to draw said guide plate and press plate together against said object.

6. The sawing guide of claim 5 wherein the minor dimension of said press plate is less than the minor dimension of said guide plate, the area of said guide plate formed of said non-metallic material being positioned at least in the area between said press plate and said indicating edge when the press plate is connected to said guide plate by said bolt means.

7. The sawing guide of claim 6 wherein an elongated recess is formed in the flat surface of said guide plate, said guide plate and press plate having corresponding apertures extending therethrough to receive said bolt means, the apertures in said guide plate being positioned in said recess.

8. The sawing guide of claim 2 wherein a first elongated groove is formed adjacent the base of said inner face and a second elongated groove is spaced therefrom between said inner face and said indicating edge, at least an area of said guide plate positioned outboard of said second groove and extending to said indicating edge being formed of nonmetallic material of a type to be cut by said power saw, said sawing guide including mounting means to secure said guide plate to said object, the mounting means including an elongated press plate for contacting the object on a surface thereof opposite to that contacted by said guide plate, and bolt means extending between said guide plate and said press plate to draw the guide plate and press plate together against the object, said press plate and guide plate having corresponding elongated slots extending therethrough for receiving said bolt means, the elongated slot in said guide plate being positioned within said second elongated groove.

9. A sawing guide for guiding a power saw having a flat base plate during the sawing of an object comprising a guide plate assembly including an elongated guide plate for engaging the saw base plate to control the line of cut, the guide plate including a flat surface for engaging the flat base plate for said saw, an upstanding shoulder extending above said flat surface including an inner face for engaging an edge of said flat base plate to define a line of cut, said upstanding shoulder extending substantially across the major dimension of said elongated plate, the flat surface of said guide plate extending from the inner face of said upstanding shoulder to an outer edge spaced from said inner face and extending in the direction of the major dimension of said elongated plate and at least one elongated slot formed through said guide plate and extending for a substantial distance across the major dimension of said guide plate between the inner edge of said upstanding shoulder and said outer edge of the guide plate, said slot being positioned within an elongated groove formed in the flat surface of said guide plate, and mounting means to secure said guide plate to said object including an elongated press plate having a major dimension substantially equal to the major dimension of said guide plate and a minor dimension which is less than the minor dimension of said guide plate, said press plate being adapted to contact the object on a surface thereof which is opposite to the surface of the object contacted by said guide plate and including an elongated slot formed therethrough having a length substantially equal to the length of the slot in said guide plate and extending for a distance across the major dimension of said press plate in correspondence with the slot formed in said guide plate, and bolt means extending through the slots in said guide plate and press plate for drawing said guide plate and press plate together in substantially coextensive relationship against opposite surfaces of said object, the slot in said guide plate and the slot in said press plate being positioned such that when said bolt means draws said guide plate and press plate against the object, the press plate is spaced inwardly of the outer edge of said guide plate.

10. The sawing guide of claim 9 wherein a second elongated groove is formed in the flat surface of said guide plate adjacent the inner face of said upstanding shoulder to receive sawdust, the flat surface of said guide plate extending from the inner face of the upstanding shoulder to said outer edge which is spaced from said inner face by a distance which is greater than the distance between the edge of the power saw base plate to engage said inner face and the saw blade for said power saw, the guide plate at least in the area bounded by and adjacent to said outer edge being formed of a non-metallic material of a type to be cut by said power saw to enable the first guided cut of said power saw to cut said guide plate to form a cut indicating edge parallel to said inner face.

* * * * *